United States Patent [19]

MacNicol et al.

[11] Patent Number: 5,672,010

[45] Date of Patent: Sep. 30, 1997

[54] LINEAR SLIDE BEARING APPARATUS

[76] Inventors: Allan E. MacNicol, 61 Doc's Dr., Grantham, N.H. 03753; Henry L. Gibbs, 273 Union St., Millis, Mass. 02054

[21] Appl. No.: 751,894

[22] Filed: Nov. 18, 1996

[51] Int. Cl.$^6$ .................................................. F16C 29/02
[52] U.S. Cl. ........................... 384/42; 384/26; 384/49
[58] Field of Search ................................. 384/7, 10, 26, 384/35, 42, 49, 47, 17, 20, 23

[56] References Cited

U.S. PATENT DOCUMENTS

| | | | |
|---|---|---|---|
| 2,672,378 | 3/1954 | McVey | 384/49 |
| 3,112,627 | 12/1963 | Gissel | 384/42 X |
| 4,247,162 | 1/1981 | Jordan | 384/42 X |
| 5,492,414 | 2/1996 | Gilbert | 384/49 |

*Primary Examiner*—Thomas R. Hannon
*Attorney, Agent, or Firm*—John E. Toupal; Harold G. Jarcho

[57] ABSTRACT

A slide bearing support having one member movable in a given direction relative to another member and including a pair of parallel slide bearing assemblies disposed between the members. Each of the assemblies includes a raceway defining guide surfaces along a travel path in the given direction; and a plurality of slide bearing members retained by the raceway and supporting the one member on the another member, the bearing members being shaped and arranged for sliding movement on the guide surfaces.

23 Claims, 2 Drawing Sheets

5,672,010

LINEAR SLIDE BEARING APPARATUS

BACKGROUND OF THE INVENTION

This invention relates generally to linear slides, and more particularly to low friction slides.

Low friction linear slides generally include a bifurcated member straddling another. Either member can be fixed and the other slides with respect to it on two linear bearings sandwiched between the bifurcations of the one member and the sides of the straddled member. Heretofore, each of the linear bearings has included a pair of opposing raceways, one carried by one member and the other carried by the other.

According to one known low friction, linear slide structure, four longitudinally extending rods form a raceway, with two of the rods retained by each slide member. Carried by the rods are either ball bearings or cylindrical bearings that roll along the rods during relative movement between the slide members. Various types of such linear slide devices include those with cylindrical rods and ball bearings, flattened rods and crossed roller bearings and grooved rods and ball bearings. Examples of those types of slide devices are disclosed in U.S. Pat. Nos. 2,672,378; 3,113,807; 3,790,233; 3,897,119; 4,696,586; 4,797,008; and 4,923,311. Although these known linear slide structures provide low friction and extremely smooth operation, they fail to provide a degree of operational stiffness desired for state-of-the-art microelectronics applications.

The object of this invention, therefore, is to provide an improved linear slide mechanism that exhibits increased stiffness in addition to low friction and extreme smoothness.

SUMMARY OF THE INVENTION

The invention is a slide bearing support having one member movable in a given direction relative to another member and including a pair of parallel slide bearing assemblies disposed between the members. Each of the assemblies includes a raceway defining guide surfaces along a travel path in the given direction; and a plurality of slide bearing members retained by the raceway and supporting the one member on the another member, the bearing members being shaped and arranged for sliding movement on the guide surfaces. The slide bearing members enhance operational stiffness while also exhibiting smoothness and low friction.

According to one feature of the invention, each raceway includes at least three elongated rods having parallel central axes, at least one of the elongated rods is retained by each of the one and another members, and the guide surfaces are formed by longitudinally extending and juxtaposed guide surface portions of the rods. The elongated rods establish low friction guide surfaces for the slide bearing members.

According to another feature of the invention, each bearing member is a cylinder having an axis parallel to the axes of the rods, and the guide surface portions are convex so as to establish a line contact between each outer surface portion and outer surfaces of the bearing members. The establishment of line contacts between guide rods and bearing members reduces friction therebetween.

According to yet another feature of the invention, the one and another members define rod retainer surfaces contacting longitudinally extending support surfaces of the rods, and the retainer surfaces are shaped and arranged to restrict movement of the rods in directions transverse to their axes and to allow unrestrained rotational movement thereof. This arrangement limits the creation of torsional stresses.

According to a further feature of the invention, each cylindrical bearing member has a length greater than its diameter. This feature prevents tumbling of the bearing members during relative movement between the one and another members.

According to another embodiment of the invention, each bearing member is a cylinder having an axis parallel to axes of the rods, and the guide surface portions are formed by longitudinally extending concave surfaces conforming to outer surfaces of the bearing members. This arrangement provides greater load and stiffness.

According to yet another embodiment of the invention, each bearing member has a plurality of longitudinally extending flat outer surface portions, and the guide surface portions are flat and engage the flat outer surface portions. This embodiment provides even higher levels of load and stiffness.

According to another embodiment of the invention, the guide surfaces are longitudinally extending, juxtaposed surfaces formed by grooves in the one and another members; and each of the bearing has a plurality of longitudinally extending flat outer surface portions engaged by the guide surfaces. This arrangement simplifies the raceway structure while also increasing load and stiffness levels.

DESCRIPTION OF THE DRAWINGS

These and other features and objects of the invention will appear from the following specific description of the embodiments taken in conjunction with the figures in which.

DESCRIPTION OF THE PREFERRED EMBODIMENT

Figure 1:
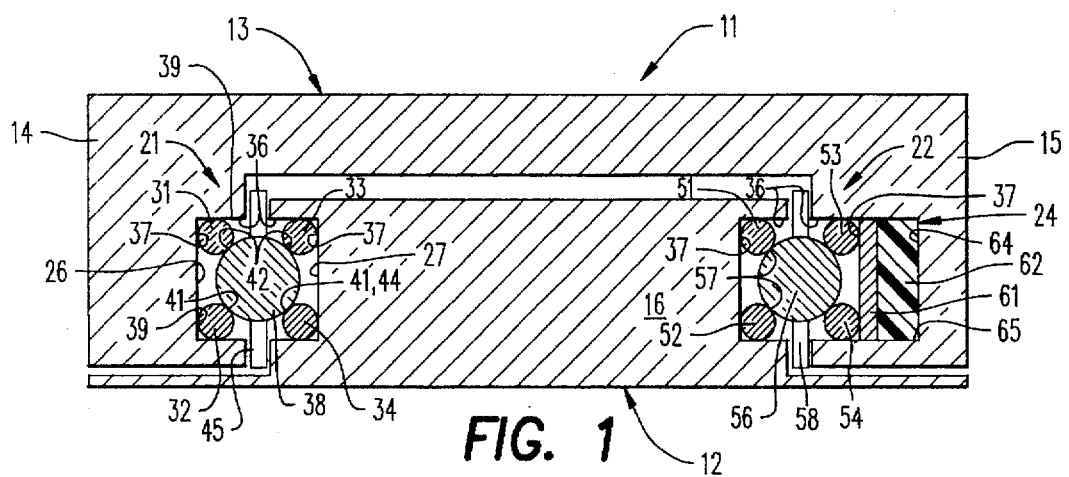
FIG. 1 is an end elevation section view of a linear slide embodiment of the invention.

A linear bearing slide 11 consists of a base member 12 and a slide member 13 which is bifurcated in that two legs 14 and 15 of the slide member straddle a pedestal 16 at the center of the base member. The slide member 13 is movable in a given direction relative to the base member 12. Contained between the legs 14, 15 of the slide member 13 are linear bearing assemblies 21, 22 that form raceways parallel to the travel direction thereof. The linear bearing assemblies 21, 22 are identical in many respects and different only in that assembly 22 makes connection with a mechanism 24 for preloading bearings in the assemblies 21, 22.

Figure 2:
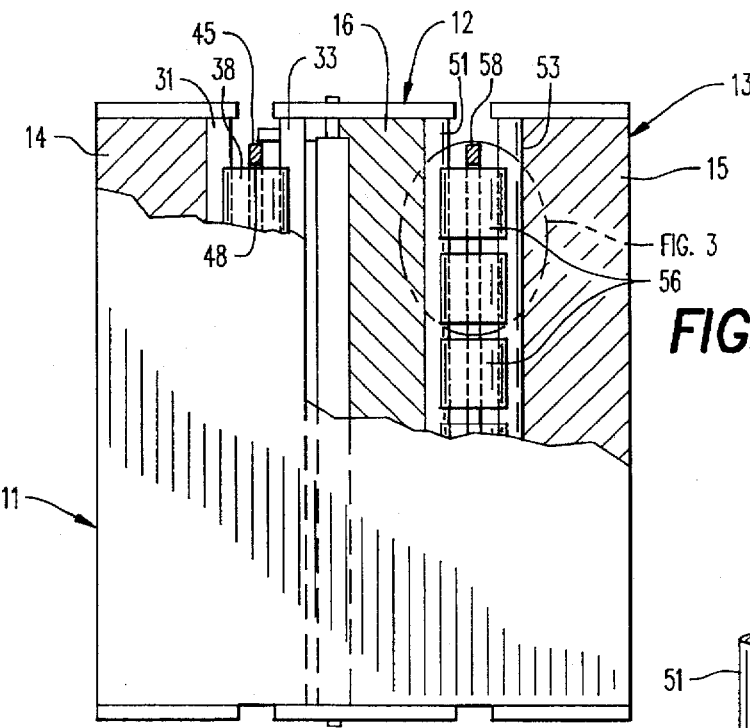
FIG. 2 is a top view partly in section of the linear slide shown in FIG. 1.

FIGS. 1 and 2 show front and top sectional views of the linear bearing slide 11 revealing details of the bearing assemblies 21, 22 and the preload mechanism 24. Bearing assembly 21 is defined by opposing rectangular channels 26, 27 in the pedestal 16 of the base member 12 and the leg 14 of the slide member 13, respectively. At corners of the channel 26 are retained elongated, cylindrical bearing rods 31 and 32 and at corners of the channel 27 are retained cylindrical bearing rods 33 and 34. The rods 31–34 have axes parallel to the travel direction of the slide member 13 and each is retained between orthogonally oriented, planar rod retainer surfaces 36, 37 formed at each corner of each of the channels 26, 27. Engaging the planar rod retainer surfaces 36, 37 along longitudinally directed lines of contact are support surfaces 39 on each of the rods 31–34.

A plurality of cylindrical bearing members 38 have axes parallel to the axes of the rods 31–34 and slide thereon in the direction of relative movement between the members 12 and 13. Formed by convex surfaces of the rods 31–34 are juxtaposed guide surface portions 41 extending longitudinally along the travel path of the slide member 13. The guide surface portions 41 engage outer surfaces 42 of the bearing members 38 along lines of contact 44 parallel to their axes. A cage 45 has a rectangular opening 48 that loosely retains the cylindrical bearing members 38.

Figure 3:
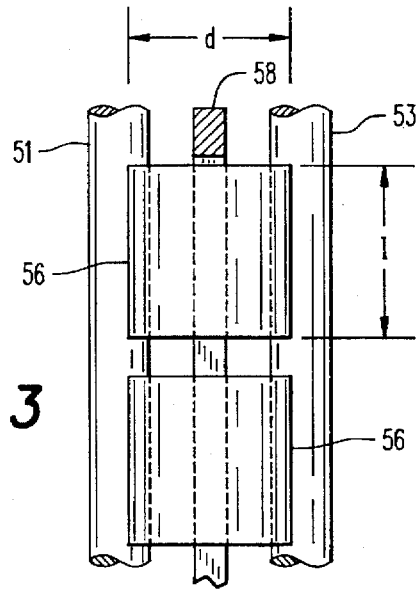
FIG. 3 is an enlarged portion of FIG. 2 showing two adjacent bearing members in a raceway from the top.
Figure 4:
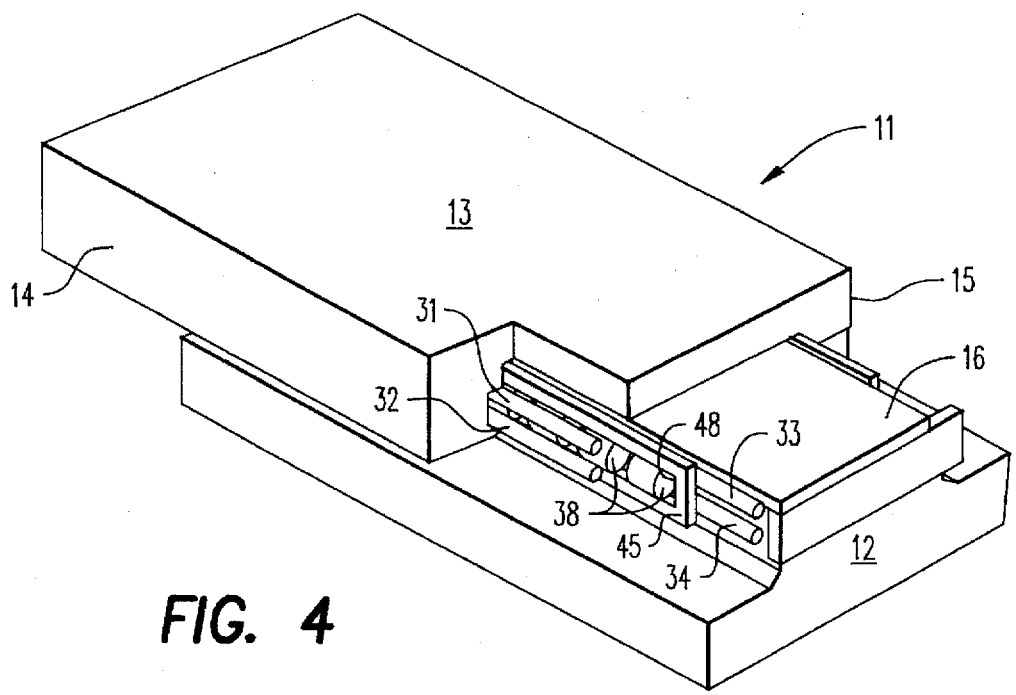
FIG. 4 is a three-quarter view of the linear slide shown in FIGS. 1–3, broken away illustrating the external appearance of the slide and some of the inside parts.

Linear bearing assembly 22 is similar to bearing assembly 21 and includes elongated cylindrical bearing rods 51–54 in positions corresponding to bearing rods 31–34, respectively. Cylindrical slide bearing members 56 engage the rods 51–54 along lines of contact 57 in the same manner as the slide members 38 engage the bearing rods 31–34. Retaining the slide bearing members 56 is a cage 58 constructed substantially as the retainer cage 45. Each of slide bearing members 38 and 56 has a greater length l (FIG. 3) than diameter d so as to insure sliding rather than tumbling movement thereof along the rods 31–34 and 51–54, respectively.

Included in the bearing assembly 22 is the preload mechanism 24. An elongated gib shim 61 is retained between a block 62 and line support surfaces of the rods 53, 54. The block 62 engages an inner surface 64 of a channel 65 formed in the leg 15 of the slide member 13. Adjustment of the longitudinal position of the gib 61 adjusts the compression on the compliant, resilient block 62 which in turn applies a transverse force on the rods 51–54. Thus, all the bearing members 56 which bear on these rods are selectively and uniformly loaded by adjustment of the gib 61. Transverse forces applied by the block 62 directly to the linear bearing 22 are transferred also to the bearing assembly 21 to thereby load the cylindrical bearing members 38.

During operation of the bearing slide 11, the slide member 13 slides on the base member 12 in a direction defined by the raceways formed by the bearing assemblies 21, 22. During such movement, the cylindrical bearing members 38 and 56, slide on the bearing rods 31–34 and 51–54, respectively, along the lines of contact 44 and 57. The lines of contact between the planar rod retainer surfaces 36, 37 and the rods 31–34 and 51–54 restrict movement of the rods in directions transverse to their axes while allowing rotational movement thereof. For this reason torsional stresses are minimized. In addition, the relatively stiff support provided by the slide bearing members 38, 56 increases load capacity while the lines of sliding contact 44, 57 between the bearing rod 31–34 and 51–54 reduce friction and improve smoothness of operation.

Figure 5:
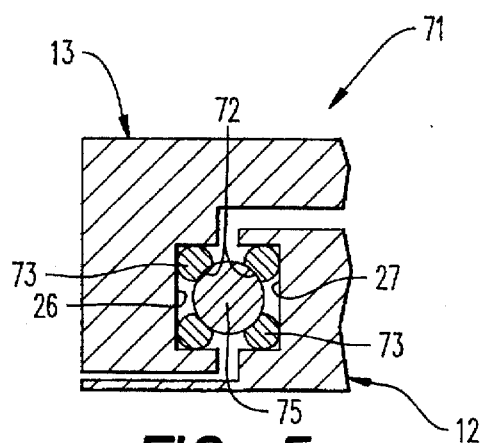
FIG. 5 is a partial cross sectional view of another linear slide embodiment of the invention.

Illustrated in FIG. 5 is another linear slide embodiment 71 of the invention. The structure and operation of embodiment 71 is similar to that described above for the embodiment 11 and identical components bear the same reference numerals. However, the convex guide surface portions 41 on the rods 31–34 and 51–54 of embodiment 11 are replaced in embodiment 71 by elongated grooves 72 that form in rods 73 concave guide surface portions that engage mating, convex outer surfaces of longitudinally aligned cylindrical bearing members 75. The grooves 72 are parallel to the axes of the rods 73 and bearing members 75. The slide bearing embodiment 71 increases load capacity and stiffness.

Figure 6:
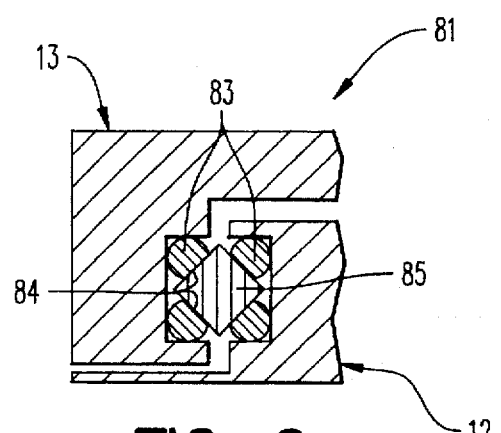
FIG. 6 is a partial cross sectional view of another linear slide embodiment of the invention.

FIG. 6 depicts another linear slide embodiment 81 of the invention. The structure and operation of embodiment 81 is similar to that described above for the embodiment 11 and identical components bear the same reference numerals. However, the convex guide surface portions 41 on the rods 31–34 and 51–54 of embodiment 11 are replaced in embodiment 81 by elongated flattened surfaces that form on rods 83 planar guide surface portions 84. In addition, the cylindrical bearing members 38, 56 of the embodiment 11 are replaced in the embodiment 81 with cubic bearing members 85 having planar outer surfaces 86 that slide along the guide surface portions 84. The outer surfaces 86 of the slide members 85 are parallel to the axes of the rods 83. As with embodiment 71, the slide bearing embodiment 81 provides increased load capacity and stiffness.

Figure 7:
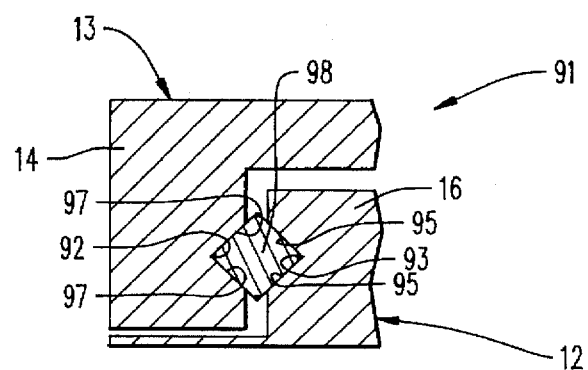
FIG. 7 is a partial cross sectional view of another linear slide embodiment of the invention.

Illustrated in FIG. 7 is another linear slide embodiment 91 of the invention. The structure and operation of embodiment 91 is similar to that described above for the embodiment 11. However, the channels 26, 27 and 65 and guide rods 31–34 and 51–54 of embodiment 11 are replaced in embodiment 91 with elongated grooves 92, 93, of triangular cross-section, formed in respectively, the legs 14, 15 of the slide member 13 and the pedestal portion 16 of the base 12. Slidable along planar surfaces 95, defined by the grooves 92, 93 are outer surfaces 97 of cubic slide members 98. The slide bearing embodiment 91 increases load capacity and stiffness while simplifying structural requirements of the assembly.

Obviously, many modifications and variations of the present invention are possible in light of the above teachings. It is to be understood, therefore, that the invention can be practiced otherwise than as specifically described.

What is claimed is:

1. A slide bearing support apparatus including one member movable in a given direction relative to another member, the combination comprising:

a pair of parallel slide bearing assemblies disposed between said members and each comprising:

a raceway defining guide surfaces along a travel path in the given direction;

a plurality of slide bearing members retained by said raceway and supporting said one member on said another member, said bearing members being shaped and arranged for sliding movement on said guide surfaces during movement of said one member relative to said another member.

2. An apparatus according to claim 1 wherein each of said bearing member has a maximum longitudinal dimension greater than its maximum transverse dimension.

3. An apparatus according to claim 1 wherein said raceway comprises at least three elongated rods having parallel central axes.

4. An apparatus according to claim 3 wherein at least one of said elongated rods is retained by each of said one and said another members, and said guide surfaces are formed by longitudinally extending and juxtaposed guide surface portions of said rods.

5. An apparatus according to claim 4 wherein each said bearing member is a cylinder having an axis parallel to said axes, and said guide surface portions are convex so as to establish a line contact between each said outer surface portion and outer surfaces of said bearing members.

6. An apparatus according to claim 5 wherein each said bearing member has a length greater than its diameter.

7. An apparatus according to claim 5 wherein each of said rods is a cylinder.

8. An apparatus according to claim 7 wherein each of said one member and said another member defines rod retainer surfaces contacting longitudinally extending support surfaces of said rods, and wherein said retainer surfaces are shaped and arranged to restrict movement of said rods in directions transverse to their axes and to allow unrestrained rotational movement thereof.

9. An apparatus according to claim 8 wherein each of said one and said another member retains a pair of said rods, and said retainer surfaces comprise for each said rod a pair of planar surfaces tangent to said support surfaces thereof.

10. An apparatus according to claim 9 wherein said retainer surfaces for each said rod are orthogonally oriented.

11. An apparatus according to claim 10 wherein each of said rods is rectilinear.

12. An apparatus according to claim 4 wherein each said bearing member is a cylinder having an axis parallel to said axes, and said guide surface portions are formed by longitudinally extending concave surfaces conforming to outer surfaces of said bearing members.

13. An apparatus according to claim 12 wherein each said bearing member has a length greater than its diameter.

14. An apparatus according to claim 12 wherein each of said one member and said another member defines rod retainer surfaces contacting longitudinally extending support surfaces of said rods, and wherein said retainer surfaces are shaped and arranged to restrict movement of said rods in directions transverse to their axes and to allow unrestrained rotational movement thereof.

15. An apparatus according to claim 14 wherein each of said one and said another member retains a pair of said rods, and said retainer surfaces comprise for each said rod a pair of planar surfaces tangent to said support surfaces thereof.

16. An apparatus according to claim 15 wherein said retainer surfaces for each said rod are orthogonally oriented.

17. An apparatus according to claim 4 wherein each said bearing member has a plurality of longitudinally extending flat outer surface portions, and said guide surface portions are flat and engage said flat outer surface portions.

18. An apparatus according to claim 17 wherein each of said one member and said another member defines rod retainer surfaces contacting longitudinally extending support surfaces of said rods, and wherein said retainer surfaces are shaped and arranged to restrict movement of said rods in directions transverse to their axes and to allow unrestrained rotational movement thereof.

19. An apparatus according to claim 18 wherein each of said one and said another member retains a pair of said rods, and said retainer surfaces comprise for each said rod a pair of planar surfaces tangent to said support surfaces thereof.

20. An apparatus according to claim 19 wherein said retainer surfaces for each said rod are orthogonally oriented.

21. An apparatus according to claim 1 wherein said guide surfaces comprise longitudinally extending, juxtaposed surfaces on, respectively, said one member and said another member.

22. An apparatus according to claim 21 wherein said guide surfaces are formed by longitudinally extending grooves in said one member and said another member.

23. An apparatus according to claim 22 wherein each said bearing member has a plurality of longitudinally extending flat outer surface portions, and said guide surface portions are flat and engage said flat outer surface portions.

* * * * *